(12) United States Patent
Butturini et al.

(10) Patent No.: US 7,007,171 B1
(45) Date of Patent: Feb. 28, 2006

(54) METHOD AND APPARATUS FOR IMPROVED FOLD RETENTION ON A SECURITY ENCLOSURE

(75) Inventors: Giuseppe Butturini, Bernareggio (IT); Mario L. Cesana, Besana in Brianza (IT); Donald S. Farquhar, Endicott, NY (US); Fulvio Fontana, Monza (IT)

(73) Assignee: International Business Machines Corporaton, Armonk, NY (US)

( * ) Notice: Subject to any disclaimer, the term of this patent is extended or adjusted under 35 U.S.C. 154(b) by 963 days.

(21) Appl. No.: 09/654,543

(22) Filed: Sep. 1, 2000

(51) Int. Cl.
*G06F 12/14* (2006.01)
*H04L 9/32* (2006.01)

(52) U.S. Cl. ............... 713/194; 713/189; 713/193; 257/678; 257/922

(58) Field of Classification Search ........... 713/194; 257/922; 361/177
See application file for complete search history.

(56) References Cited

U.S. PATENT DOCUMENTS 4,490,205 A 12/1984 Warhol
4,657,717 A 4/1987 Cattanach et al.
4,946,640 A 8/1990 Nathoo
5,068,074 A 11/1991 De Rego
5,114,654 A 5/1992 Hosoi
5,539,379 A * 7/1996 MacPherson ............... 340/550
5,858,500 A * 1/1999 MacPherson ................ 428/68
6,111,953 A * 8/2000 Walker et al. ............... 380/51

FOREIGN PATENT DOCUMENTS

GB 2292709 A * 3/1996

* cited by examiner

*Primary Examiner*—Gilberto Barrón, Jr.
*Assistant Examiner*—Nima Khomassi
(74) *Attorney, Agent, or Firm*—Schmeiser, Olsen & Witts; William H. Steinberg

(57) ABSTRACT

A method and apparatus for forming a security enclosure having improved fold retention. In particular, the enclosure is formed by folding a flexible tamper respondent cloth around an electronic assembly. An adhesive on the inner folded surfaces of the cloth temporarily retains the folds. The enclosure is then exposed to heat and pressure to promote improved adhesion strength of the adhesive, thereby improving fold retention.

29 Claims, 5 Drawing Sheets

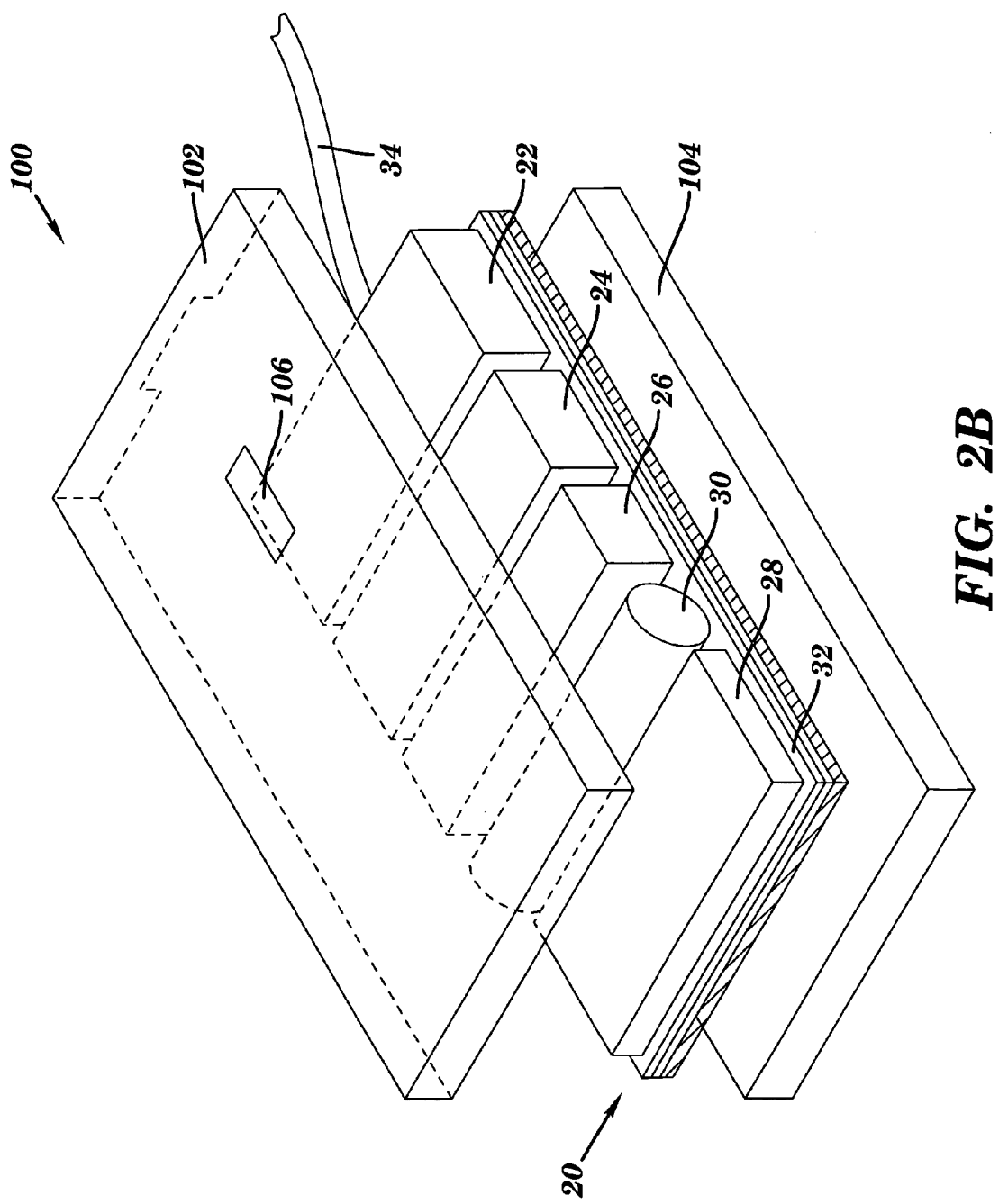

METHOD AND APPARATUS FOR IMPROVED FOLD RETENTION ON A SECURITY ENCLOSURE

BACKGROUND OF THE INVENTION

1. Technical Field

The present invention relates generally to the detection of intrusions into electronic assemblies, and more particularly, to the retention of a security enclosure capable of detecting such intrusions.

2. Related Art

In electronic network commerce applications, it is a requirement to protect the contents of the associated computer systems from being unlawfully read or modified. It is conventional practice to provide certain encryption schemes in which data is transmitted and received in an encrypted form and only authorized people who have the encryption key codes may read or modify the data. However, an unauthorized person with sufficient skills and knowledge may attempt to bypass software encryption controls by making a physical attack against the computer hardware to attempt a direct interrogation of the memory components and other devices. Defense from these types of attacks requires that tamper resistant physical packaging be provided for critical encryption components, in such a way that unauthorized attempts to gain entry are detected and encryption key codes are immediately erased.

One means of providing physical protection against intrusion is the use of an electrical grid surrounding the encryption module, which when broken triggers the requisite signal to disable the unit. It is known in the art to surround and protect an encryption module with a membrane consisting of one or more flexible dielectric layers having electrically conductive traces thereon. The membrane is electrically connected to the module, then wrapped, folded and bonded around the module, wherein a sticky pressure sensitive bonding adhesive adheres the membrane around the module. The traces are intentionally made fragile so that they are damaged if an attempt is made to remove the membrane. Further the membrane may be potted in a molding material, which offers further protection as its removal would also damaged the traces.

While the membrane must meet the physical security requirements, it must not be so sensitive that it falsely triggers the erasure of the key codes as a result of handling during the manufacturing assembly process, or subsequently due to environmental conditions associated with changes in temperature, humidity or atmospheric pressure. Accordingly, one of the drawbacks in the current art is that the security membranes intended for wrapping, folding, and bonding to an enclosure may be too stiff to readily fold as a result of the thickness and other properties of the various layers. As a result, during the assembly folding process, a fold may be completed but the stiffness of the membrane may result in poor retention of the fold, as the elastic strain energy associated with bending the membrane overwhelms the adhesive strength of the bonding adhesive. This can result in two conditions. First, the unfolding can damage the fragile circuit traces as the adhesive pulls against them during unfolding of the membrane. Second, unfolding can produce the formation of openings or tunnels through which the subsequently applied molding materials may leak into the interior of the enclosure, resulting in the possibility of an immediate failure or potentially a reduction in reliability of the internal components.

Thus, there is a need for better means for performing the assembly wrapping, folding, and bonding operation in such a way that the membrane is not damaged, and that molding material can not subsequently leak into the interior of the enclosure. Contrary to meeting this requirement stands the fact that the available membrane materials have certain physical properties associated with their materials selection and cross-sections that can not be readily altered, and further the fact the conductive traces are intentionally fragile so as to detect any security attack.

SUMMARY OF THE INVENTION

In accordance with the present invention, the first embodiment provides a method of forming a security enclosure, comprising: providing an electronic assembly; enclosing the assembly in a tamper respondent wrap, such that the wrap forms fold lines at a first and second end of the assembly; placing the enclosed assembly in a fixture, wherein the fixture comprises a base upon which the assembly rests, a first stationary arm mounted on the base holding the fold lines at the first end of the assembly, a second arm slidably mounted on the base, and a traversing mechanism to bias the second arm toward the fold lines at the second end of the assembly; and heating the enclosed assembly.

The second embodiment of the present invention provides a method of producing a tamper respondent enclosure, comprising: enclosing a cryptographic processor in a tamper respondent sheet, wherein an adhesive material secures the enclosure; holding the enclosed cryptographic processor such that the adhesive material remains intact; and applying heat to the enclosed cryptographic processor to strengthen the adhesive material.

The third embodiment of the present invention provides a method of forming a security enclosure, comprising: providing a circuit card; enclosing the card in a tamper respondent cloth, wherein an adhesive secures fold lines of the cloth; holding the fold lines of the cloth to maintain adhesive contact; and heating the enclosed card.

The fourth embodiment of the present invention provides a method of assembling a security enclosure comprising: providing a fixture; providing an enclosure having a cloth member thereon; placing the enclosure in the fixture; heating the enclosure; and removing the enclosure from the fixture.

The fifth embodiment of the present invention provides an apparatus for securing a security enclosure, comprising; a base upon which a security enclosure rests; a first stationary arm mounted on the base, which holds a first end of the security enclosure; a second arm slidably mounted on the base; and a traversing mechanism to bias the second arm toward a second end of the security enclosure.

The foregoing and other features and advantages of the invention will be apparent from the following more particular description of the embodiments of the invention.

BRIEF DESCRIPTION OF THE DRAWINGS

The embodiments of this invention will be described in detail, with reference to the following figures, wherein like designations denote like elements, and wherein:

FIG. 2B depicts the electronic assembly of FIG. 2A having an enclosure therearound in accordance with the present invention;

DESCRIPTION OF THE PREFERRED EMBODIMENTS

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the embodiment. Although the drawings are intended to illustrate the present invention, the drawings are not necessarily drawn to scale.

Figure 1:
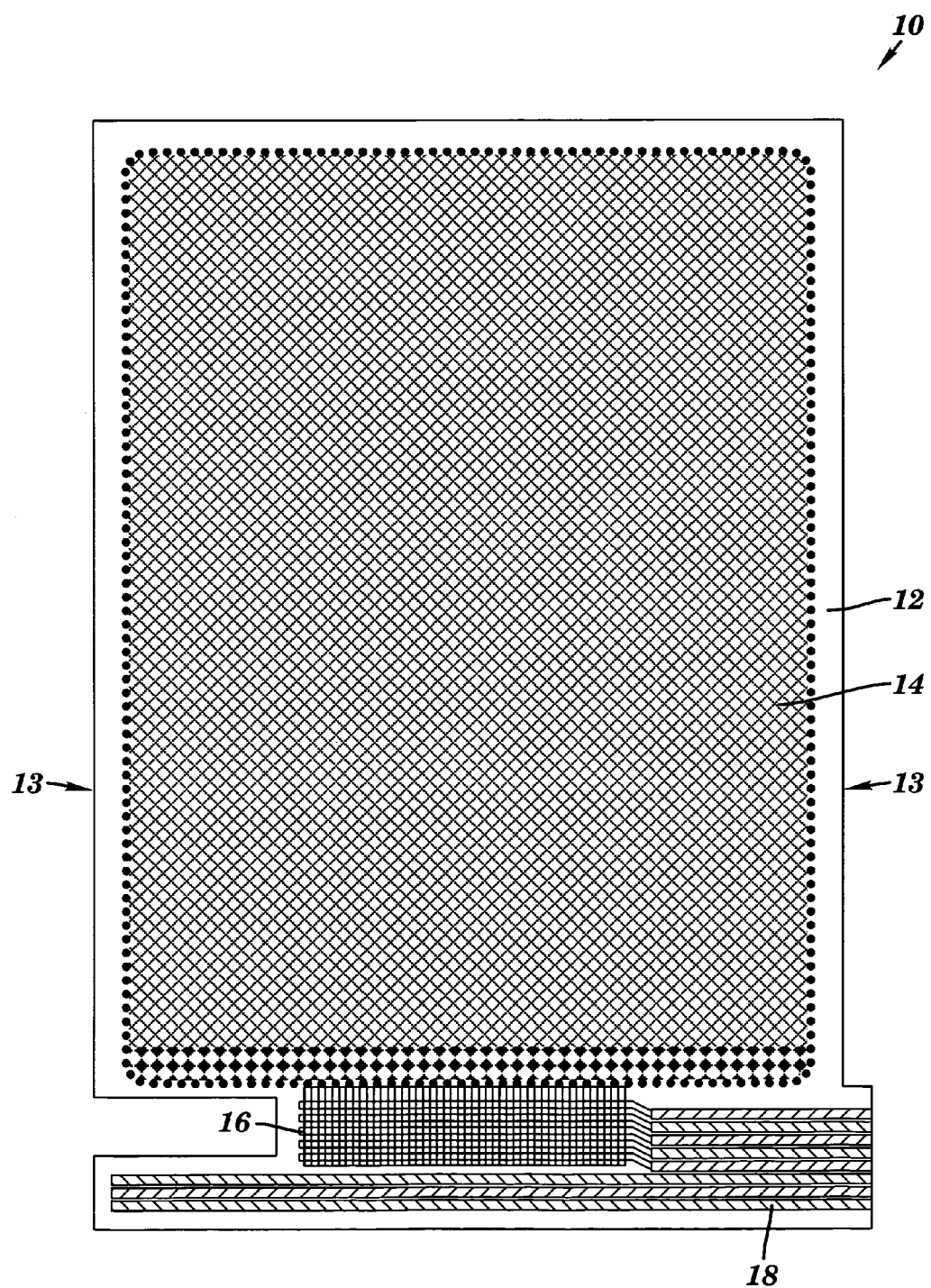
FIG. 1 depicts a top view of a tamper respondent wrap in accordance with the present invention.

Referring to the drawings, FIG. 1 shows a tamper respondent wrap or cloth 10 as known and used in the art. The tamper respondent cloth 10 may be a sheet of composite material similar to one made by a division of W. L. Gore (Dundee, Scotland), as described in a patent to MacPherson (U.S. Pat. No. 5,858,500), which is herein incorporated by reference. In particular, the tamper respondent cloth 10 comprises a laminate formed of a number of separate layers, including a delamination respondent layer, and a pierce and laser respondent layer.

The respondent layers of the tamper respondent cloth 10 comprise electrically responsive line elements that are disposed on a film material. The pierce and laser respondent layer is intended to detect efforts to penetrate the security enclosure by means of forming a small hole through the tamper respondent cloth 10. The delamination respondent layer is intended to detect efforts to peel the tamper respondent cloth 10 away from the outer surface of the inner enclosure. The delamination respondent layer is provided with an adhesive characteristic such that peeling it away from a surface will damage the electrically responsive materials therein. These respondent layers are adhered together by means of an adhesive. Thus the tamper respondent cloth 10 comprises respondent film layers that are bonded together with an adhesive. Moreover, an adhesive is provided to retain the folded and overlapping portions upon folding.

A top view of one such respondent layer is shown in FIG. 1. The layer includes an electrically insulating film 12, made of polyester film or other similar material, having a plurality of diagonally extending ink traces or lines 14 formed on a first and second side of the film 12 (one side shown). The lines 14 are formed by printing carbon loaded polyester ink on the surface of the film 12. The lines 14 printed on each side of the film 12 are then selectively connected at the edges 13 of the film 12. The lines 14 form a plurality of continuous conductors which break easily if attempts are made to penetrate the delamination respondent layer or the pierce and laser respondent layer.

Connection between the lines 14 and an enclosure monitor of the electronic assembly (described infra) is provided by an integrated ribbon cable 18. Like the lines 14, the ribbon cable 18 is formed by printing carbon loaded polyester ink onto a first surface of the layer 12. Connectors 16, also formed on the first surface of the layer 12, make the connection between the ribbon cable 18 and the lines 14.

Figure 2A:
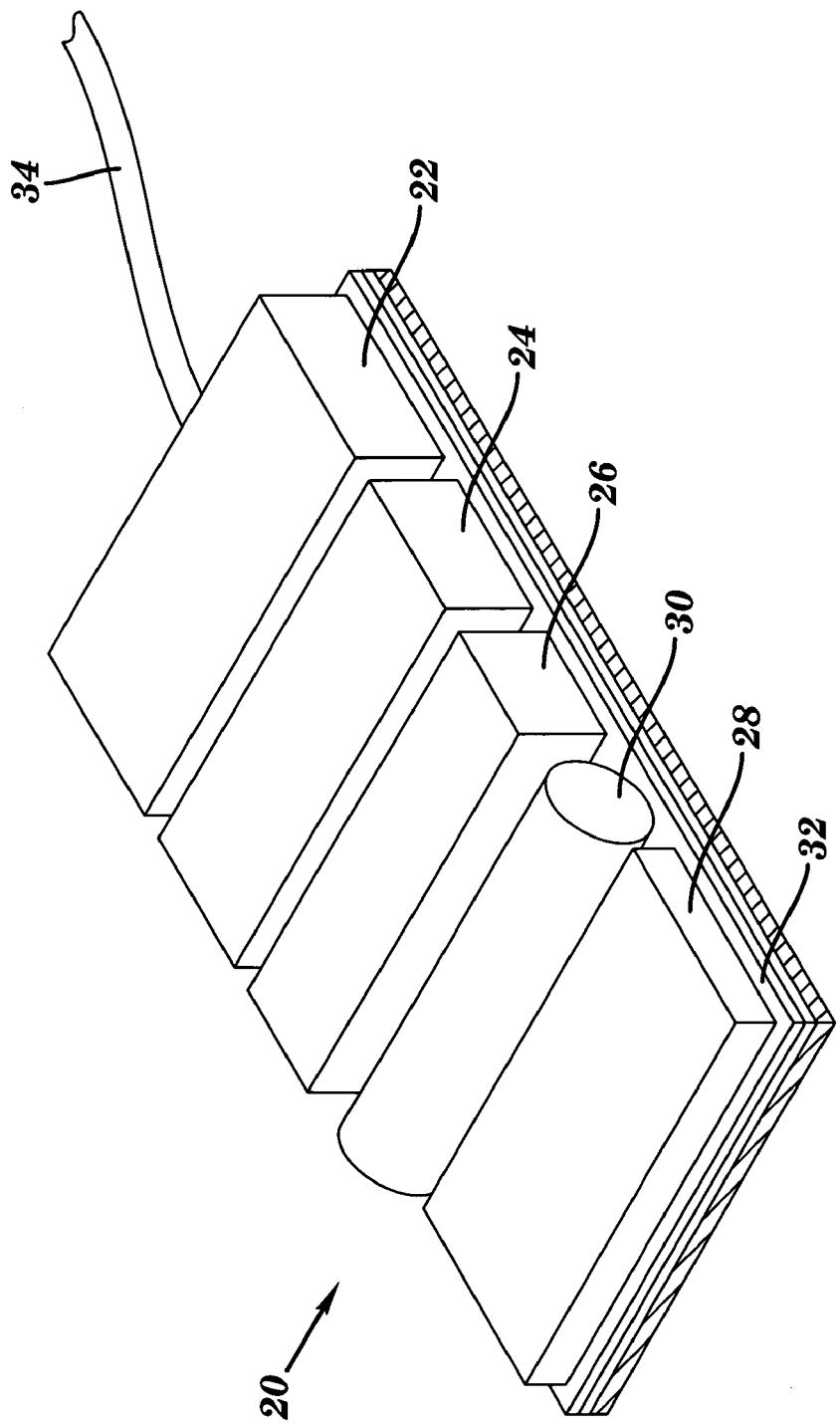
FIG. 2A depicts an electronic assembly in accordance with the present invention.

FIG. 2A shows an electronic assembly such as a cryptographic processor card 20 in accordance with the present invention. The cryptographic processor card 20 contains an encryption module 22 which carries the secured sensitive information, a memory 24 which stores a key or code necessary to access the stored information in the encryption module 22, an erase circuit 26 which erases the stored information in the encryption module 22 in the event the tamper respondent cloth 10 around the cryptographic processor card 20 is breached, an enclosure monitor 28 which monitors the resistance of the lines 14 of the cloth 10 and activates the erase circuit 26 in the event a breach is detected, and a battery 30, all of which are mounted on a printed circuit board 32. The cryptographic processor card 20 further includes a plurality of connecting or ribbon cables 34 (one of which is shown), which are used to connect multiple enclosures to one another on a board (not shown), as known in the art.

The cryptographic processor card 20 may then be positioned inside a housing 100 comprising for example a top half 102 and a bottom half 104 of a sheet metal box, as illustrated in FIG. 2B. The two halves 102, 104 may be joined together, and include openings 106 as need to insert electrical cables into the processor card 20. The housing 100 may be designed to provide a suitable surface for wrapping the tamper respondent cloth 10.

Figure 3:
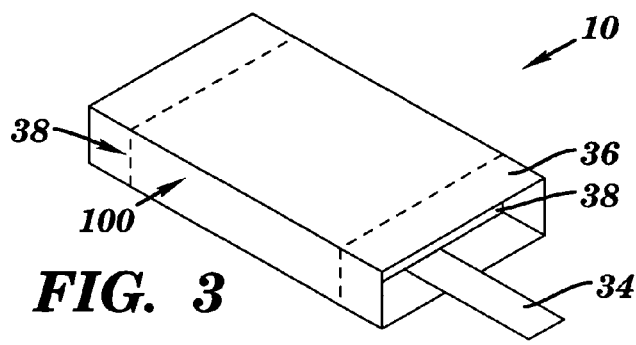
FIG. 3 depicts a first step in enclosing the assembly of FIG. 2A within the wrap of FIG. 1 in accordance with the present invention.

The tamper respondent cloth 10 is then wrapped around the housing 100 containing the cryptographic processor card 20 in a manner similar to that of a gift-wrapped present, as illustrated in FIG. 3. The cloth 10 overlaps near the middle of the cryptographic processor card 20, on the underside of the card 20. The connectors 16 and ribbon cable 18 (FIG. 1) are wrapped within the cloth 10 such that the ribbon cable 18 interconnects with the enclosure monitor 28 within the enclosure.

Figure 4:
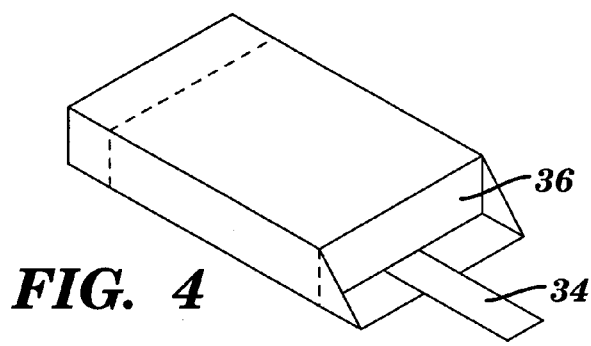
FIG. 4 depicts a second step in enclosing the assembly of FIG. 2A within the wrap of FIG. 1 in accordance with the present invention.
Figure 5:
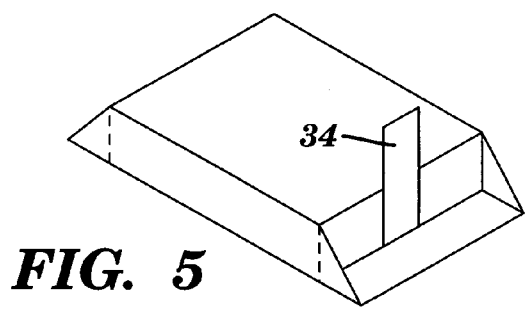
FIG. 5 depicts a third step in enclosing the assembly of FIG. 2A within the wrap of FIG. 1 in accordance with the present invention.

A top flap 36 at each end of the cloth 10 is folded down over the ends 38 of the housing 100 containing the card 20 (one end 38 is shown in FIG. 4 for ease of illustration). An adhesive on the inner surface of each top flap 36 adheres each top flap 36 to the respective ends 38 for ease of assembly. As illustrated in FIG. 5, the connection cable 34 at the one end are folded upward to abut the folded top flap 36 (noting that only one end of the cryptographic processor card 20, the end nearest the encryption module 22, has the connection cable 34 extending therefrom in the current illustration, however, the present invention is not intended to be limited to the quantity nor location of the connection cable shown).

Figure 6:
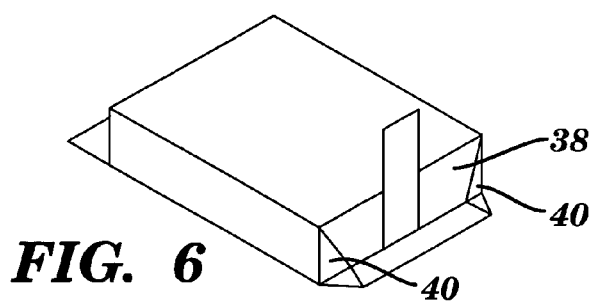
FIG. 6 depicts a fourth step in enclosing the assembly of FIG. 2A within the wrap of FIG. 1 in accordance with the present invention.
Figure 7:
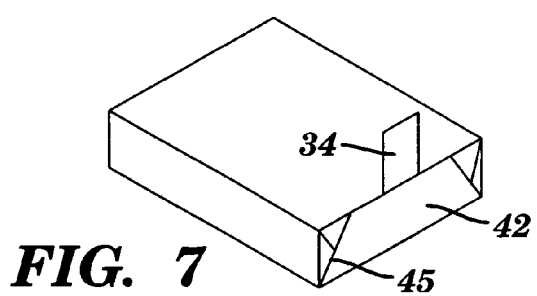
FIG. 7 depicts a fifth step in enclosing the assembly of FIG. 2A within the wrap of FIG. 1 in accordance with the present invention.

As illustrated in FIG. 6, the side flaps 40 at each end 38 of the housing 100 containing the card 20 are folded inward to overlap the top flap 36 at each end 38, and the connection cable 34 at the one end. As with the top flap 36, each side flap 40 includes an adhesive on the inner surface of each flap 40 such that each side flap 40 adheres to each top flap 36 at each end 38 of the housing 100 containing the card 20, and the connection cable 34 at one end 38 of the card 20, during assembly. Each bottom flap 42 is then folded upward to overlap the top 36 and side flaps 40, as well as the connection cable 34 (at the one end 38 of the card 20), as illustrated in FIG. 7. As with the top and side flaps 36, 40, each bottom flap 42 includes an adhesive on the inner surface of the flap 42 to adhere each bottom flap 42 to the connection cable 34 and/or the side and top flaps 36, 40.

It should be noted that the present invention is not intended to be limited to the order of folding the tamper respondent cloth 10 around the card 20 described above. In contrast, the side flaps 40 may be folded inward first, followed by either the top 36 or bottom flaps 42. Alternatively, the bottom flap 42 may be folded upward first, followed by either the side flaps 40 or the top flap 36, and so on.

Figure 9:
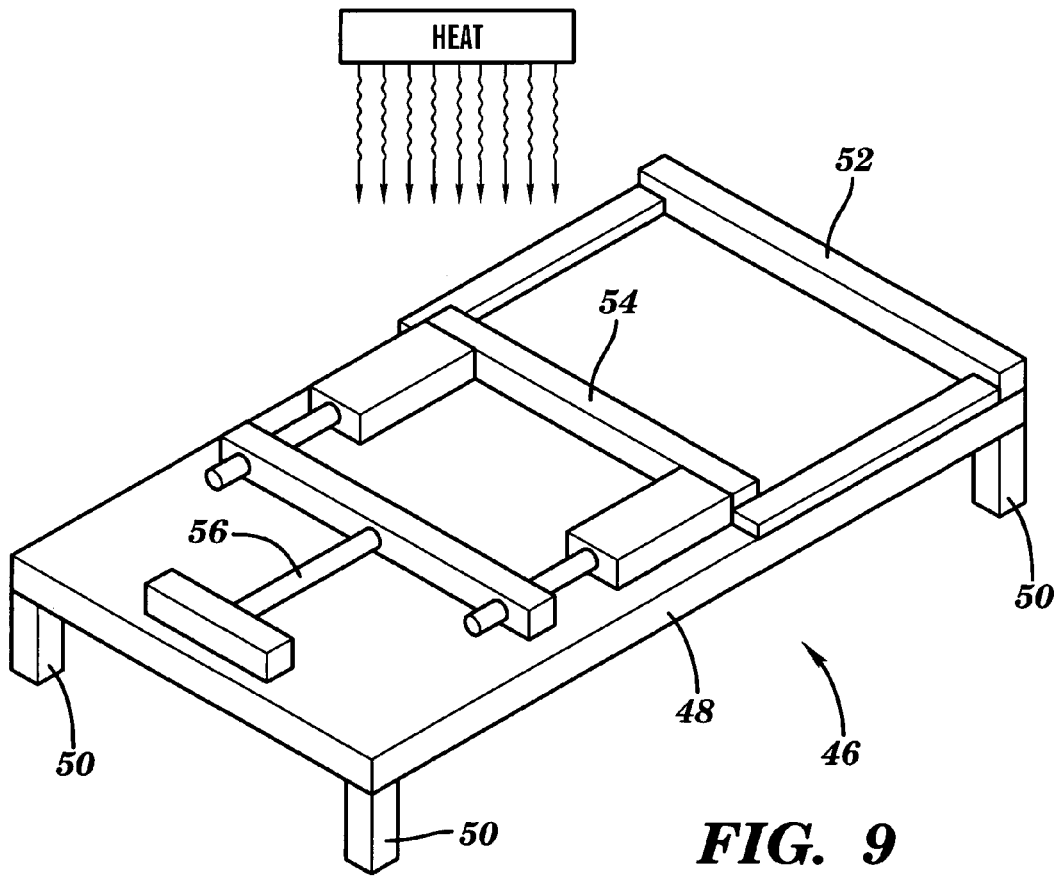
FIG. 9 depicts a clamping device used in accordance with the present invention.

The enclosure 44, having fold lines 45 at each end 38 thereof, is then placed in a clamping device or fixture 46 similar to the one shown in FIG. 9. The clamping device 46 includes a base 48 and a plurality of legs 50 thereunder. A stationary clamping arm 52 is securely mounted to a first end of the base 48. A traversing clamping arm 54 is slidably mounted to the base 48. A biasing or traversing mechanism 56, located at a second end of the base 48, is connected to the traversing clamping arm 54. The traversing mechanism 56, comprising a biasing screw, a hydraulic mechanism, an electromechanical sensor motor, etc., functions to bias the traversing clamping arm 54 toward and/or away from the stationary clamping arm 52.

In practice, the enclosure 44 is placed on the base 48 of the clamping device 46, such that one end 56 of the enclosure 44 is positioned against the stationary clamping arm 52. The traversing clamping arm 54 is then biased toward the other end 56 of the enclosure 44 via the biasing mechanism 56.

Figure 8:
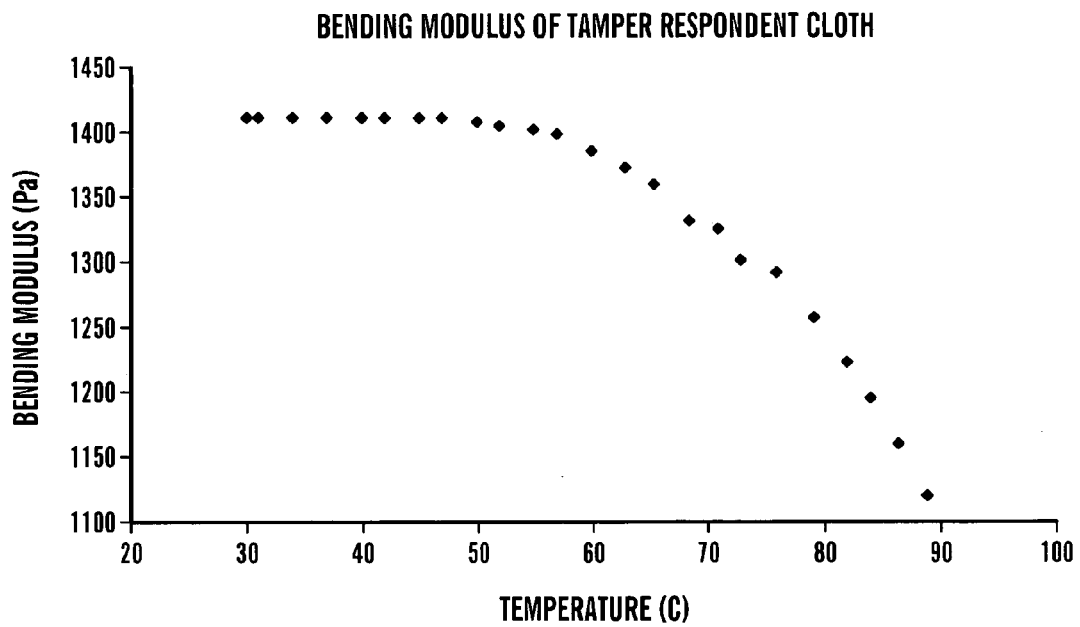
FIG. 8 depicts a graph illustrating the bending modulus of the wrap of FIG. 1 in accordance with the present invention.

Once the traversing clamping arm 54 of the clamping device 46 is adjusted such that the enclosure 44 fits snugly between the traversing clamping arm 54 and the stationary clamping arm 52, the enclosure 44 and clamping device 46 are exposed to a temperature of approximately 40–90° C., and preferably between 50–70° C. (because the ink lines 14 may begin to soften and reflow at temperatures above approximately 80° C.), 60° C. being the optimal temperature, for approximately 1 hour (refer to the temperature chart of FIG. 8). The enclosure 44 is then removed from the clamping device 46. Thereafter, the enclosure 44 may undergo additional processing as known in the art, i.e., applying a polyurethane coating, etc.

Heating the tamper respondent cloth 10 initially causes the layers of adhesive to soften, thereby allowing the pierce and laser respondent layer to slide past the delamination respondent layer in the fold areas such that the cloth 10 bends more easily. Upon continued heating the adhesive cross-links or cures due to thermal aging, thereby making the adhesive become more solidified. After removing the heat, the adhesive continues to harden in the folded position during cooling. As a result, the folded cloth 10 forming the enclosure exhibits improved fold retention and reduced stress. And unlike the previous methods of forming enclosures, the cloth 10 does not come un-wrapped during processing. Accordingly, the subsequent encapsulant material, e.g., a polyurethane coating, will not flow past the folds into the inner enclosure to damage the cryptographic processor card 20, as often happens with conventional methods.

It should be noted that the enclosure 44 described and illustrated herein is only one example of the type of enclosure that may be use in combination with the present invention. The present invention is in no way intended to be limited to use in conjunction with electronic assemblies of this size, shape and form. Rather, the enclosure may take the form of a wedge-shaped enclosure, a cuboid, a cube, etc.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

We claim:

1. A method of forming a security enclosure, comprising:
   providing an electronic assembly;
   enclosing the assembly in a tamper respondent wrap, such that the wrap forms fold lines at a first and second end of the assembly;
   placing the enclosed assembly in a fixture, wherein the fixture comprises a base upon which the assembly rests, a first stationary arm mounted on the base holding the fold lines at the first end of the assembly, a second arm slidably mounted on the base, and a traversing mechanism to bias the second arm toward the fold lines at the second end of the assembly; and
   heating the enclosed assembly.

2. The method of claim 1, further comprising heating the enclosed assembly at a temperature of 40–90° C.

3. The method of claim 1, further comprising heating the enclosed assembly for 1 hour.

4. The method of claim 1, wherein the fixture comprises a clamping device.

5. The method of claim 1, wherein the tamper respondent wrap comprises a flexible material having tamper respondent detection devices.

6. The method of claim 1, wherein the second arm is a traversing clamping arm, and wherein the traversing mechanism comprises a biasing screw, a hydraulic mechanism, and an electro-mechanical sensor motor which collectively function to bias the traversing clamping arm toward or away from the first stationary arm.

7. The method of claim 1, wherein the fixture comprises a clamping device for mechanically clamping the enclosed assembly, wherein said heating is performed after said placing is performed, wherein during said heating the enclosed assembly is held snugly in the clamping device by being mechanically clamped between the second arm and the first stationary arm, wherein during said heating the enclosed assembly is exposed to an ambient atmosphere and is directly exposed to heat which passes from a heating source through the ambient environment to the enclosed assembly, and wherein after said heating is performed the method further comprises removing the enclosed assembly from the clamping device.

8. The method of claim 1, wherein the tamper respondent wrap comprises:
   at least one pierce and laser respondent layer;
   a delamination respondent layer; and
   an adhesive between the pierce and laser respondent layer and the delamination respondent layer.

9. The method of claim 8, wherein the pierce and laser respondent layer and the delamination respondent comprise a plurality of ink lines on at least one side of the pierce and laser respondent layer and the delamination respondent layer.

10. The method of claim 8, wherein said heating initially causes the adhesive to soften which results in the pierce and laser respondent layer sliding past the delamination respondent layer in fold areas of the tamper respondent wrap such that the tamper respondent wrap bends more easily, wherein said heating causes the adhesive to cross-link or cure due to thermal aging which results in the adhesive becoming more solidified, and wherein after said heating is performed the adhesive continues to harden in said fold areas while the tamper respondent wrap is being cooled which results in the tamper respondent wrap having an improved fold retention.

11. The method of claim 1, wherein the electronic assembly comprises a cryptographic processor.

12. The method of claim 11, wherein the cryptographic processor comprises a printed circuit board, having mounted thereon:
   an encryption module to carry secured sensitive information;
   a memory to store a key necessary to access the information;
   an erase circuit to erase the information in the encryption module in the event the tamper respondent wrap is breached; and
   an enclosure monitor to activate the erase circuit in the event breach is detected.

13. A method of forming a security enclosure, comprising:
   providing a circuit card;
   enclosing the card in a tamper respondent cloth, wherein an adhesive secures fold lines of the cloth;
   holding the fold lines of the cloth to maintain adhesive contact; and
   heating the enclosed card,
   wherein the method further comprising holding the cloth in a clamping device to maintain the adhesive contact, and
   wherein the clamping device comprises:
      a base upon which a security enclosure rests;
      a first stationary arm mounted on the base, which holds a first end of the security enclosure;
      a second arm slidably mounted on the base; and
      a traversing mechanism to bias the second arm toward a second end of the security enclosure.

14. The method of claim 13, further comprising heating the enclosed card at 60° C. for 1 hour.

15. The method of claim 13, further comprising curing the adhesive.

16. The method of claim 13, wherein the circuit card comprises a cryptographic processor.

17. The method of claim 13, wherein the second arm is a traversing clamping arm, and wherein the traversing mechanism comprises a biasing screw, a hydraulic mechanism, and an electro-mechanical sensor motor which collectively function to bias the traversing clamping arm toward or away from the first stationary arm.

18. The method of claim 13, wherein during said heating the enclosed card is held snugly in the clamping device by being mechanically clamped between the second arm and the first stationary arm, wherein during said heating the enclosed card is exposed to an ambient atmosphere and is directly exposed to heat which passes from a heating source through the ambient environment to the enclosed card, and wherein after said heating is performed the method further comprises removing the enclosed card from the clamping device.

19. The method of claim 13, wherein the tamper respondent cloth comprises at least one pierce and laser respondent layer, a delamination respondent layer, and an adhesive between the pierce and laser respondent layer and the delamination respondent layer, wherein said heating initially causes the adhesive to soften which results in the pierce and laser respondent layer sliding past the delamination respondent layer in fold areas of the tamper respondent cloth such that the tamper respondent cloth bends more easily, wherein said heating causes the adhesive to cross-link to cure due to the thermal aging which results in the adhesive becoming more solidified, and wherein after said heating is performed the adhesive continues to harden in said fold areas while the tamper respondent cloth is being cooled which results in the tamper respondent cloth having an improved fold retention.

20. A security enclosure, comprising:
   an electronic assembly;
   a tamper respondent wrap, such that the wrap forms fold lines at a first and second end of the assembly, said wrap enclosing the electronic assembly; and
   a fixture in which the enclosed assembly is placed, wherein the fixture comprises a base upon which the assembly rests, a first stationary arm mounted on the base holding the fold lines at the first end of the assembly, a second arm slidably mounted on the base, and a traversing mechanism to bias the second arm toward the fold lines at the second end of the assembly.

21. The security enclosure of claim 20, wherein the tamper respondent wrap comprises a flexible material having tamper respondent detection devices.

22. The security enclosure of claim 20, wherein the second arm is traversing clamping arm, and wherein the traversing mechanism comprises a biasing screw, a hydraulic mechanism, and an electro-mechanical sensor motor which collectively function to bias the traversing clamping arm toward or away from the first stationary arm.

23. The security enclosure of claim 20, wherein the clamping comprises a plurality of legs attached to the base, and wherein the base is disposed between the plurality of legs and both the first stationary arm and the second arm.

24. The security enclosure of claim 20, wherein the fixture comprises a clamping device.

25. The security enclosure of claim 24, wherein the enclosed electronic assembly is being held snugly in the clamping device by being mechanically clamped between the second arm and the first stationary arm, and wherein the enclosed electronic assembly is being exposed to an ambient atmosphere and is directly exposed to heat that has passed through the ambient environment.

26. The security enclosure of claim 20, wherein the tamper respondent wrap comprises:
   at least one pierce and laser respondent layer;
   a delamination respondent layer; and
   an adhesive between the pierce and laser respondent layer and the delamination respondent layer.

27. The security enclosure of claim 26, wherein the pierce and laser respondent layer and the delamination respondent layer comprise a plurality of ink lines on at least one side of the pierce and laser respondent layer and the delamination respondent layer.

28. The security enclosure of claim 20, wherein the electronic assembly comprises a cryptographic processor.

29. The security enclosure of claim 28, wherein the cryptographic processor comprises a printed circuit board, having mounted thereon:
- an encryption module to carry secured sensitive information;
- a memory to store a key necessary to access the information;
- an erase circuit to erase the information in the encryption module in the event the tamper respondent wrap is breached; and
- an enclosure monitor to activate the erase circuit in the event a breach is detected.

* * * * *

UNITED STATES PATENT AND TRADEMARK OFFICE
CERTIFICATE OF CORRECTION

PATENT NO. : 7,007,171 B1
DATED : February 28, 2006
INVENTOR(S) : Butturini et al.

It is certified that error appears in the above-identified patent and that said Letters Patent is hereby corrected as shown below:

<u>Title page,</u>
Item [74], *Attorney, Agent, or Firm*, delete "Witts" and insert -- Watts --.

<u>Column 1,</u>
Line 44, delete "damaged" and insert -- damage --.

<u>Column 7,</u>
Line 28, delete "event breach" and insert -- event a breach --.

<u>Column 8,</u>
Line 13, delete "to cure" and insert -- or cure --.
Line 36, delete "arm is traversing" and insert -- arm is a traversing --.
Line 42, delete "clamping comprises" and insert -- clamping device comprises --.

Signed and Sealed this

Sixth Day of June, 2006

JON W. DUDAS
*Director of the United States Patent and Trademark Office*